United States Patent [19]

Watanabe

[11] Patent Number: 4,816,945
[45] Date of Patent: Mar. 28, 1989

[54] IMPROVED LOCKING AND EJECTION MECHANISM FOR MAGNETIC DISK PACK RECORDING AND REPRODUCING APPARATUS

[75] Inventor: Yoshiyuki Watanabe, Tokyo, Japan

[73] Assignee: Fuji Photo Film Co., Ltd., Kanagawa, Japan

[21] Appl. No.: 942,321

[22] Filed: Dec. 16, 1986

[30] Foreign Application Priority Data

Dec. 18, 1985 [JP] Japan ............................... 60-284574
Dec. 28, 1985 [JP] Japan ............................... 60-299237
Jan. 14, 1986 [JP] Japan ................................. 61-7112
Mar. 11, 1986 [JP] Japan ................................ 61-52949

[51] Int. Cl.$^4$ ............................................. G11B 17/02
[52] U.S. Cl. .............................. 360/99.07; 360/99.03
[58] Field of Search ................................. 360/97, 99

[56] References Cited

U.S. PATENT DOCUMENTS 4,647,996 3/1987 Shimaoka et al. .................... 360/97
4,656,542 4/1987 Shibata ................................. 360/97

Primary Examiner—Robert S. Tupper
Attorney, Agent, or Firm—Sughrue, Mion, Zinn, Macpeak & Seas

[57] ABSTRACT

A magnetic disk pack loading and unloading device of a so-called slot-in power loading type which loads a magnetic disk pack stored in a magnetic disc pack holder into a magnetic recording and/or reproducing apparatus. In the device, there is provided such an eject lever as to be able to prevent the magnetic disc pack from being flown out from the pack holder when unloading the magnetic disc pack. The eject lever can not be locked when the power is cut off, so that the magnetic disc pack can not be stored in the inner part of the pack holder. There are also provided a magnetic disc pack dual insertion preventive mechanism and means for releasing the pressure to the magnetic disc by the magnetic head when the power is off during the magnetic recording or reproduction.

6 Claims, 10 Drawing Sheets

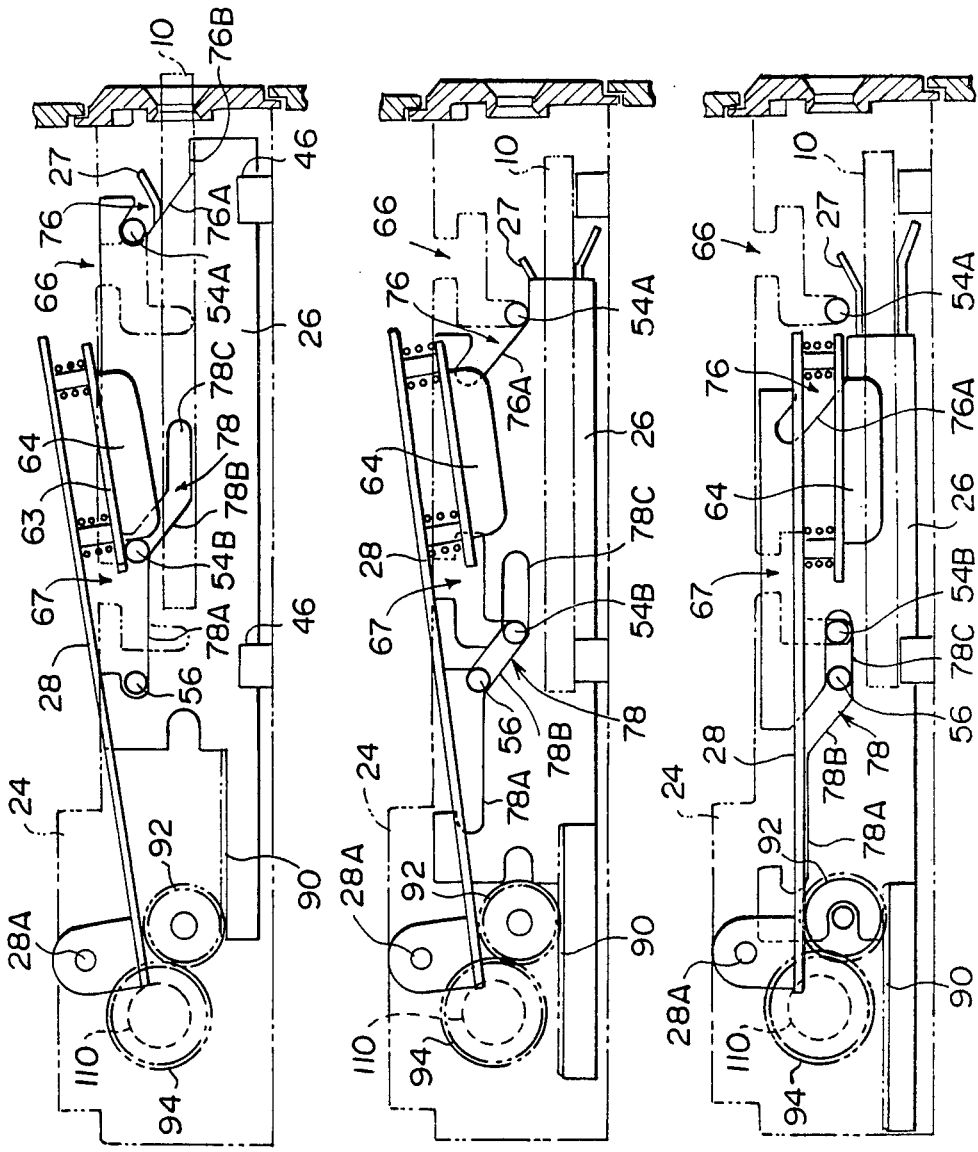

FIG.9
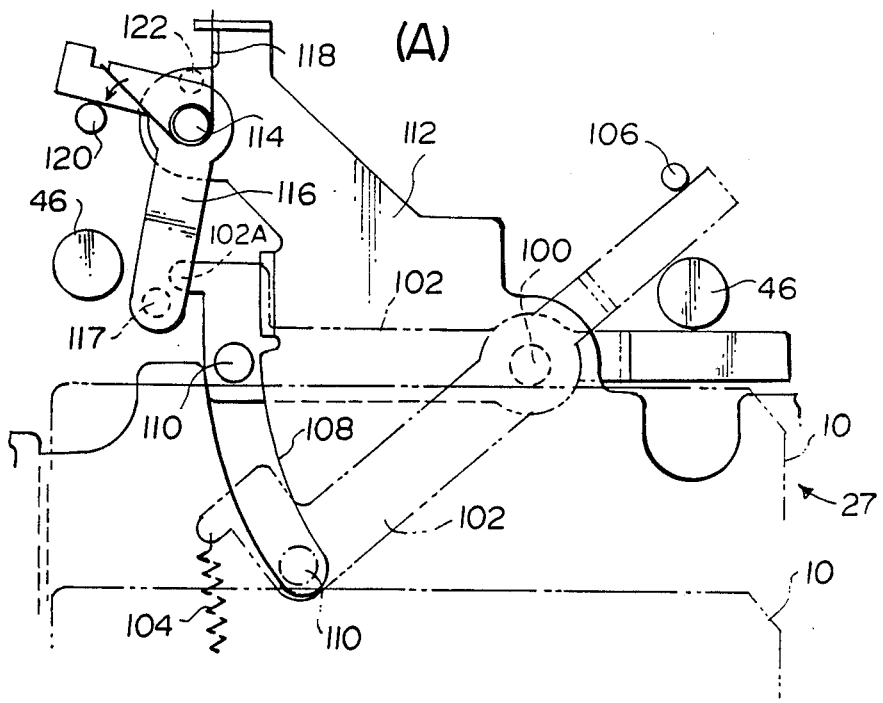
(A)
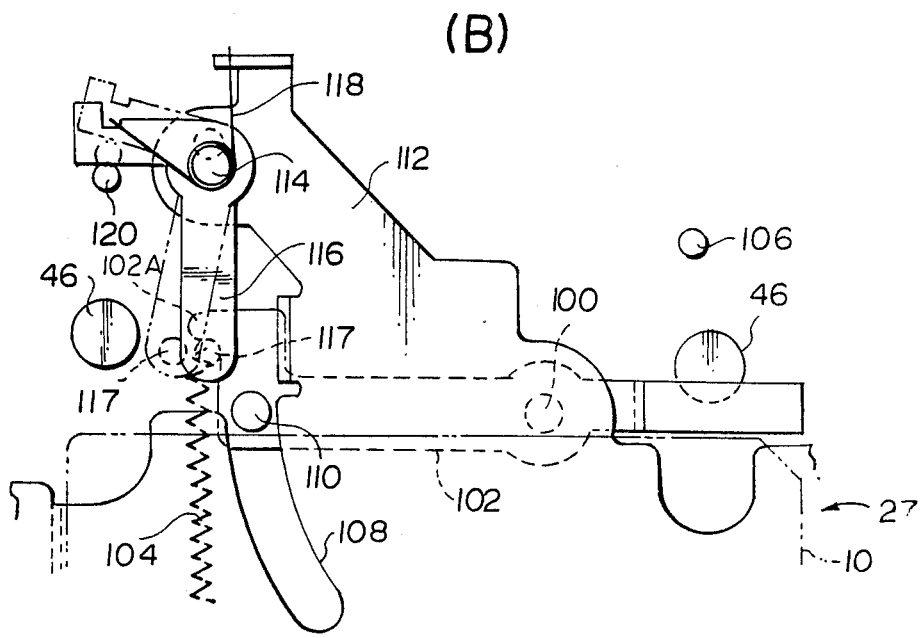
(B)

FIG. 9
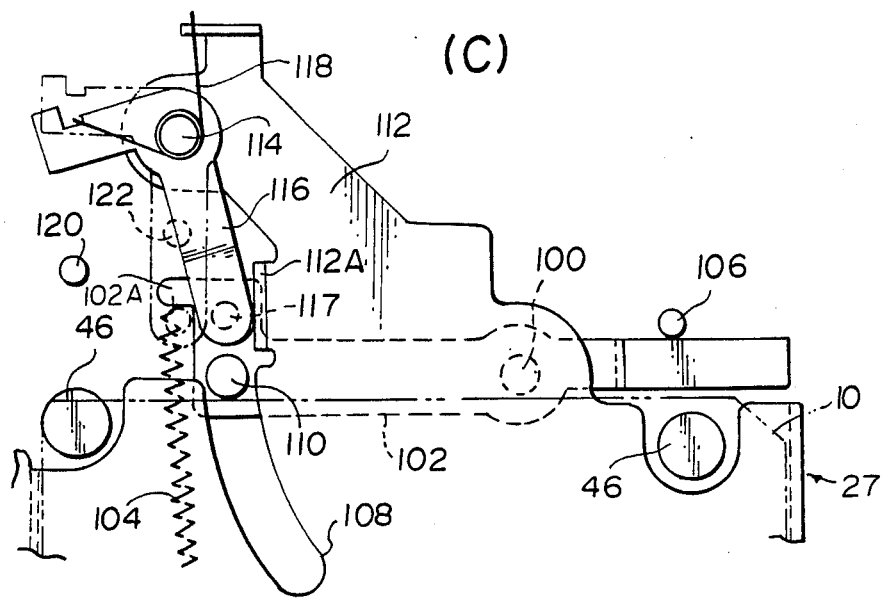
(C)
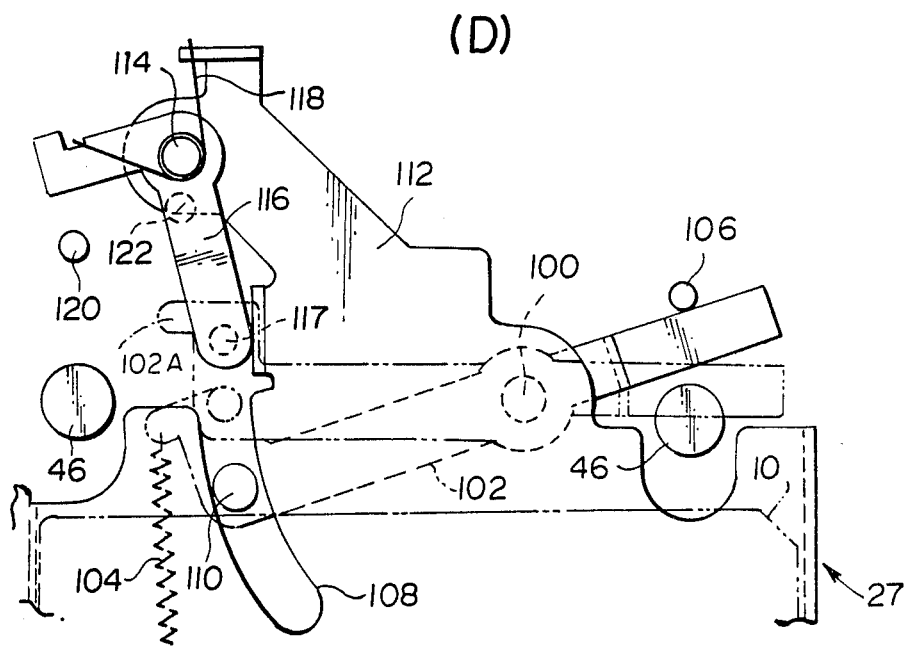
(D)

FIG.12
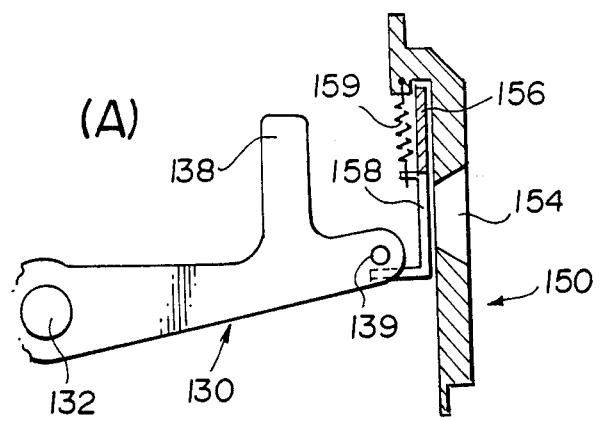
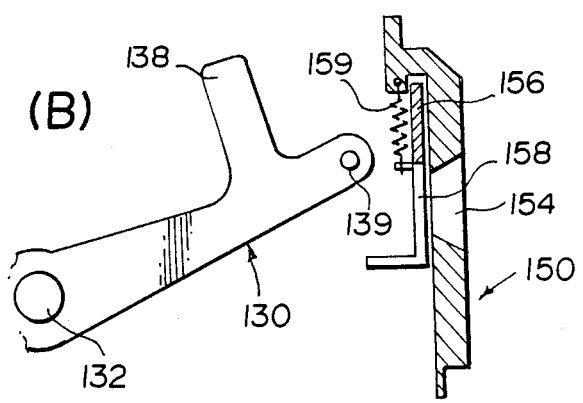
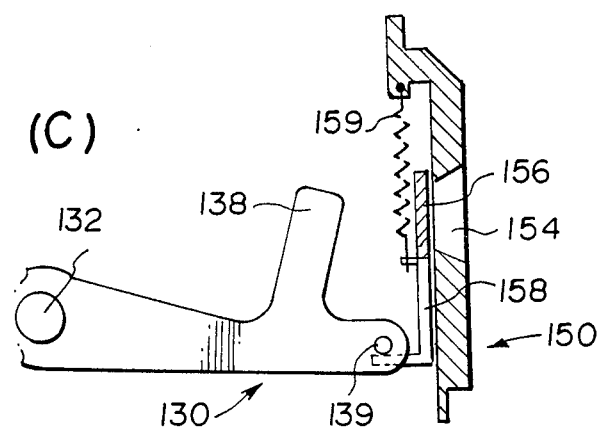

IMPROVED LOCKING AND EJECTION MECHANISM FOR MAGNETIC DISK PACK RECORDING AND REPRODUCING APPARATUS

BACKGROUND OF THE INVENTION

1. Field of the Invention

This invention relates to a device for loading or unloading a magnetic disc pack and, in particular, to a device for loading or unloading a magnetic disc pack used in a magnetic recorder and/or reproducer for an electronic camera and the like and incorporating therein a magnetic disc capable of magnetically recording still image information and the like.

2. Description of the Prior Art

Recently, there has been developed an electronic still camera system which comprises a combination of an image pickup device such as a charge coupled device (CCD), an image pickup tube or the like and a recording device using as its recording medium an inexpensive magnetic disc having a comparatively higher memory capacity, and in which a subject is still-photographed electronically and recorded into the magnetic disc while it is rotating and reproduction of an image recorded therein is carried out by separately arranged means such as a television receiver, a printer or the like.

The magnetic disc employed in the above-described system is generally used in the form of a magnetic disc pack. Specifically, in the magnetic disc pack, there is included a rotatable magnetic disc capable of magnetically recording therein still image information or the like, and the magnetic disc pack is mounted into a magnetic recording device incorporated in an electronic camera or into a magnetic reproduction device which is arranged integrally with or separately from the recording device before the magnetic disc pack can be actually used.

Conventionally, there has been known a so-called slot-in power loading device as a device for loading or unloading the magnetic disc pack. The slot-in power loading device is arranged such that, when the magnetic disc pack is inserted into and stored in a holder movable supported by a main body of a magnetic recording/reproducing apparatus via an insertion opening formed in a front panel of the apparatus main body, it can move the holder automatically by means of a necessary route to thereby guide the magnetic disc of the magnetic disc pack within the holder to a rotary drive shaft in the apparatus main body for mounting thereto.

In the above-mentioned magnetic disc pack loading/unloading device, there is provided an eject lever within the holder which biases the magnetic disc pack in a direction to discharge it, and, when loading, the magnetic disc pack is inserted into the holder against the biasing force of the eject lever and is secured therein. However, since the magnetic disc pack is formed light in weight, if the holding of the magnetic disc pack within the holder when unloading it is released, then the magnetic disc pack is flies forcefully from the holder by the biasing force of the eject lever. This means that the slot-in power loading device is inconvenient to handle.

Also, in the conventional magnetic disc pack loading/unloading device, when the magnetic disc pack is held within the holder, then the eject lever becomes locked. Thus, when the locking of the eject lever is released in connection with the positional displacements of the holder caused by an electric driving operation, if the eject lever is once locked, it is not easy to take out the magnetic disc pack while power is turned off due to an accident or the like. Since the shutter of the magnetic disc pack is open within the holder, it is not desired to leave it in this condition for a long peiod of time in view of dust prevention.

Further, in the conventional magnetic disc pack loading/unloading device, there is a possibility that although one magnetic disc pack is already stored in the holder, another magnetic disc pack may be inserted in error thereinto from the insertion opening thereof. The double insertion of the two magnetic disc packs may damage the important parts such as a magnetic head and the like.

In addition, in the conventional magnetic disc pack loading/unloading device, while the magnetic recording or reproducing operation is being performed, if the power supply is cut off in error, then it is impossible to unload the magnetic disc pack and thus the magnetic head is left in a state for a long time in which it is in contact with the magnetic disc. If the magnetic disc is left in this condition for a long period of time, then there is produced a pressure sign or the like therein, resulting in a dropout or the like.

SUMMARY OF THE INVENTION

The present invention has been developed to obviate the above-mentioned disadvantages of the conventional magnetic disc pack loading/unloading devices and has an object thereof the provision of a magnetic disc pack loading/unloading device in which there is provided in a holder a spring for ejection adapted to apply its biasing force in a gentle manner when unloading a magnetic disc pack so that the magnetic disc pack will not fly forcefully from the holder.

It is another object of the invention to provide a magnetic disc pack loading/unloading device in which an eject lever cannot be locked while the power supply is turned off so as to facilitate the takeout operation of a magnetic disc pack.

It is still another object of the invention to provide a magnetic disc pack loading/unloading device which can prevent double insertion of magnetic disc packs.

It is yet another object of the invention to provide a magnetic disc pack loading/unloading device which is capable of separating at least a magnetic head and a magnetic disc from each other even if the power supply is cut off in error while a magnetic recording or reproducing operation is being performed so as to prevent production of a pressure sign.

In attaining the foregoing objects, according to the invention, there is provided a magnetic disc pack loading/unloading device for use in a magnetic recording/reproducing apparatus in which a center core provided in the central portion of rotation of a magnetic disc rotatably stored in a magnetic disc pack is brought into engagement with a rotary drive shaft provided on the side of a main body of the magnetic recording/reproducing apparatus, the magnetic disc is then rotated and a magnetic head is moved in the radial direction of the magnetic disc so as to carry out a magnetic recording or reproducing operation. Specifically, the present magnetic disc pack loading/unloading device comprises a holder for receiving and storing the above-mentioned magnetic disc pack therein and it is arranged such that, when loading the magnetic disc pack, after the holder is moved in the same direction as the insertion direction of the magnetic disc pack into the holder by operating drive means, the holder is moved in a direction intersecting with the magnetic disc pack insertion direction to thereby bring the above-mentioned center core of the magnetic disc into engagement with the rotary drive shaft, and, when unloading the magnetic disc pack, the above-mentioned drive means is operated in the opposite direction to move the holder in the opposite direction through the above-mentioned movement route taken in loading so as to be able to guide the magnetic disc pack to a position where it can be taken out. The present magnetic disc pack loading-/unloading device is characterized by an eject lever pivotally mounted to the holder for energizing the magnetic disc pack in a direction where it is discharged; locking means capable of locking the eject lever when the magnetic disc pack is completely stored; lock released means for releasing the locking of the ejector lever by the locking means when the magnetic disc pack is located in a position in which the above-mentioned magnetic recording/reproducing operation is carried out; and, brake means for returning and moving the eject lever in connection with the operation of the holder to be performed when unloading the magnetic disc pack.

Also, according to another aspect of the invention, the above-mentioned lock means in the magnetic disc pack loading/unloading device is adapted to be able to lock the eject lever after the magnetic disc pack is inserted into the holder and the holder is moved by a given amount of distance in the insertion direction of the magnetic disc pack in the above-mentioned loading operation.

According to still another aspect of the invention, the magnetic disc pack loading/unloading device is further characterized by a lid rotatably supported to an insertion opening for insertion of the magnetic disc pack into the holder and adapted to open or close the insertion opening; and a lock member rotatably supported on the side of the apparatus main body and adapted such that one end thereof can be guided into a slider for moving the holder and, when the slider is advanced to a predetermined position, the other end is able to lock the lid.

According to yet another aspect of the invention, the magnetic disc pack loading/unloading device is still further characterized by first power supply means for supplying electric power to the above-mentioned drive means; second power supply means provided separately from the first power supply means; detection means for detecting the fact that the power supply to the drive means from the first power supply means has been stopped; and, control means operable in response to a signal generated from the detection means and indicating the stoppage of the above-mentioned power supply to cause the second power supply means to supply electric power to the drive means so that the slider for moving the holder can be retreated to a position where at least the magnetic head is not able to press against the magnetic disc in the magnetic disc pack.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 2 is a side view to show a position in which a magnetic disc pack is inserted or taken out in the above embodiment of the invention;

FIG. 3 is a side view to show a state in which the magnetic disc pack is mounted to a drive shaft in the above embodiment of the invention;

FIG. 4 is a side view to show a recording or reproducing state in the above embodiment of the invention;

FIGS. 9 (A) through (D) are respectively explantory views to illustrate the operation of the eject mechanism used in the present magnetic disc pack loading/unloading device;

FIGS. 12 (A) through (C) are respectively explanatory views to illustrate the operation of a display mechanism of the misinsertion preventing mechanism; and, FIG. 13 is a circuit diagram to show a circuit used for a slider drive motor in the magnetic disc pack loading-/unloading device according to the invention.

DETAILED DESCRIPTION OF THE INVENTION

Detailed description will hereunder be given of the preferred embodiment of a device for loading and/or unloading magnetic disc pack constructed according to the present invention with reference to the accompanying drawings.

Figure 5:
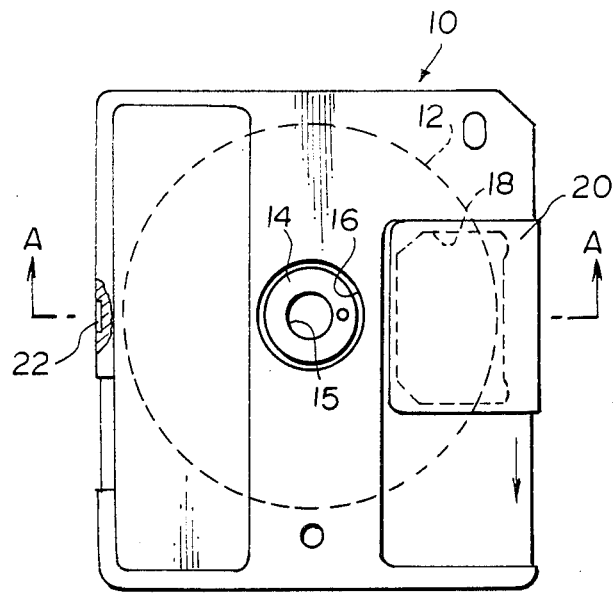
FIG. 5 is a plan view of a magnetic disc pack used in the above embodiment of the invention.
Figure 6:
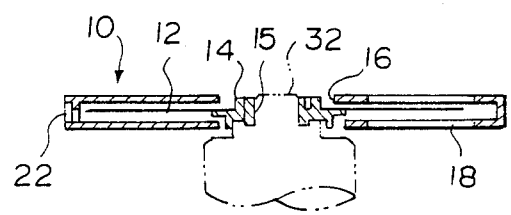
FIG. 6 is a section view of the magnetic disc pack taken along the line A—A in FIG. 5.

In FIG. 5, there is shown a plan view of a magnetic disc pack employed in a magnetic recording/reproducing apparatus for use in an electronic camera or the like, and in FIG. 6, there is shown a section view which is taken along the line A—A in FIG. 5. As shown in FIG. 5, the magnetic disc pack 10 is formed in a substantially square shape and stores therein a rotatable magnetic disc 12 for recording therein still image information and the like. In the central portion of the magnetic disc 12, there is provided a center core 14 to be used as a reinforcing member, and the center core 14 is exposed externally from a circular opening 16 formed in the magnetic disc pack 10. The center core is also formed with a central hole 15 which is in turn provided with a resilient piece (not shown). A drive shaft 32 to be described later is adapted such that it can be inserted into the central hole 15 formed in the center core 14 against the energizing force of the resilient piece provided in the hole 15. The magnetic disc pack 10 is formed with a window portion 18 in which a magnetic head to be described later is situated, and the window portion 18 can be opened or closed by a slidable shutter 20. That is, before the magnetic disc pack 10 is inserted into a holder to be described later, the shutter 20 closes the window portion 18 to thereby protect the magnetic disc 12 from dust, and, when the magnetic disc pack 10 is inserted into the holder and is engaged by a claw provided in the holder, then the shutter 20 is caused to move downwardly in FIG. 5 to thereby open the window portion 18 so that an operation to record still image information and the like into the magnetic disc 12 or to reproduce it therefrom is possible. The magnetic disc pack 10 is formed with an engagement recess 22 at the end thereof located opposed to the shutter 20, and the recess 22 is used to provisionally secure the magnetic disc pack 10 when it is inserted into the holder. The structure of the above-mentioned magnetic disc pack 10 is determined by a unified standard.

Figure 1:
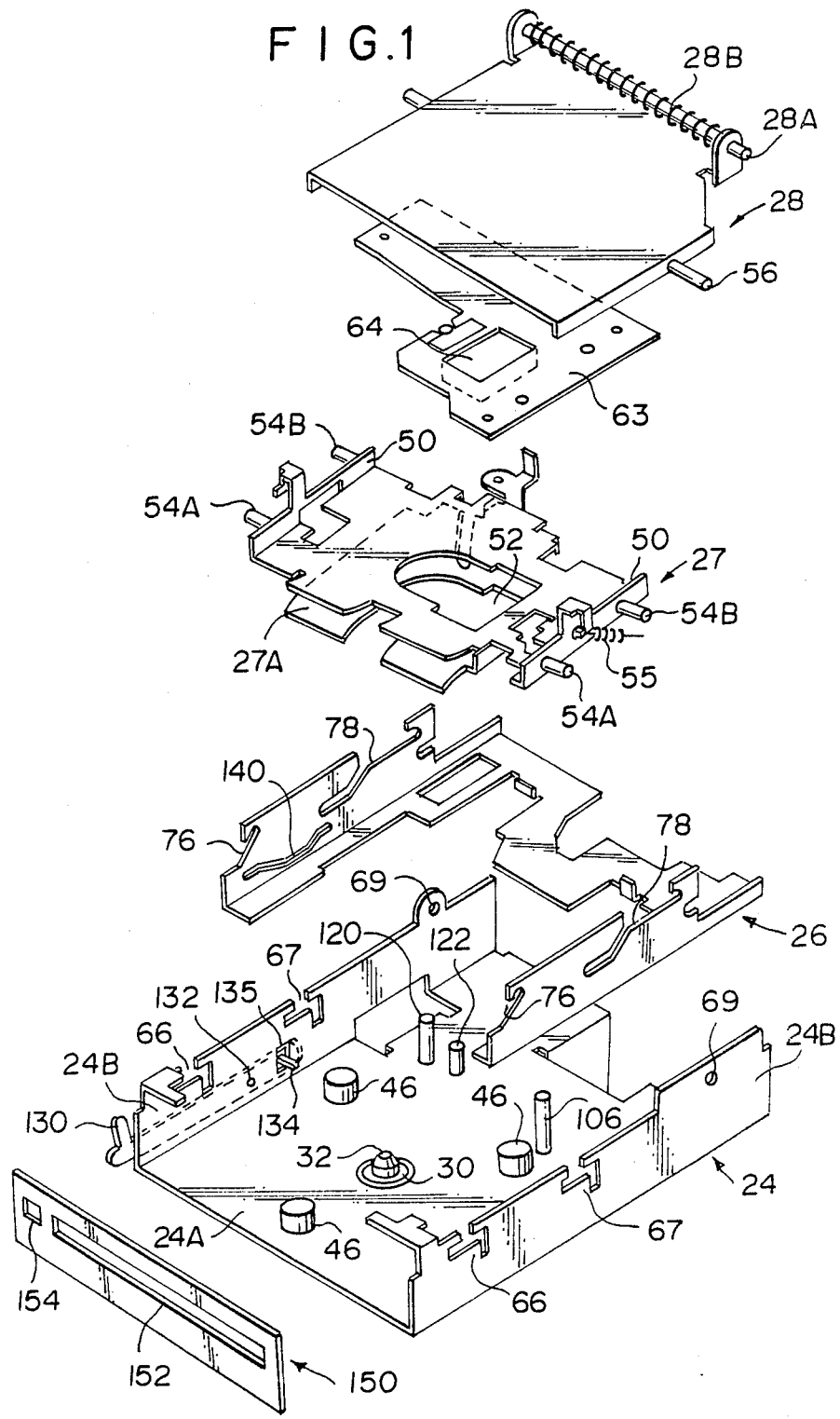
FIG. 1 is an exploded, perspective view to show the whole structure of a magnetic recording/reproducing apparatus to which an embodiment of the invention is applied.

Referring now to FIG. 1, there is shown an exploded perspective view of a magnetic recording/reproducing apparatus which is mainly composed of a support plate 24, a slider 26, a holder 27, and a regulation plate holder 28. Referring first to the internal structure of the support plate 24, there is provided in the support plate 24 a motor 30 for driving the magnetic disc; the drive shaft 32 of the motor 30 is fitted into the central hole 15 of the center core 14 provided in the magnetic disc pack 10 shown in FIG. 5; and, the magnetic disc 12 is rotated at a given rate within the magnetic disc pack 10 by means of the drive shaft 32 of the motor 30. Also, in the support plate 24, there are provided a magnetic head, a head carriage to which the magnetic head is mounted, and a feed motor to moving the head carriage via a lead screw, although all of them are not shown. Therefore, if the feed is rotated every given number of rotations, then the head carriage is moved every given pitch in the axial direction of the lead screw by means of rotation of the lead screw to thereby move the magnetic head in the radial direction of the magnetic disc 12, so that the still image information can be recorded into or reproduced from the magnetic disc 12 for every track thereof. In the drawings, reference numerals 46, 46, 46, respectively designate positioning pins for positioning the magnetic disc pack 10.

The support plate 24 is folded formed into a U-shaped configuration and is composed of a bottom portion 24A and a pair of side portions 24B, 24B. Each of the side portions 24B, 24B is formed with substantially L-shaped restricting grooves 66 and 67 which serve to restrict the movements of two guide pins 54A, 54B of the holder 27 in the two directions thereof, that is, one direction in which the magnetic disc pack 10 is inserted and the other direction intersecting with the magnetic disc pack insertion direction. Specifically, the restricting groove 66 restricts the guide pin 54A of the holder 27 when the guide pin 54A is inserted into the restricting groove 66, while the restricting groove 67 restricts the guide pin 54B of the holder 27 when the guide pin 54B is fitted thereinto.

On the support plate 24, there is arranged the slider 26 in such a manner that it can be freely moved in the insertion direction of the magnetic disc pack 10. The slider 26, which is provided with a rack 90, can be moved by means of a gear 92 and a drive gear 94, (see FIG. 2). In the slider 26, there are formed a pair of cams 76 which are used to guide the guide pins 54A of the holder 27, and a pair of cams 78 serving to guide pins 54B of the holder 27 as well as the guide pins 56 of the regulation plate holder 28. These cams 76, 78 are adapted to restrict the vertical movements of the holder 27 and the regulation plate holder 28. As shown in FIG. 2, each of the cams 76 is composed of a tapered 76A and a flat portion 76B continuing therefrom. Also, each of the cams 78 is composed of an upper flat portion 78A, a tapered portion 78B and a lower flat portion 78C.

The above-mentioned cams 76, 78 of the slider 26 are respectively provided in a paired manner on the two sides of the slider 26, and, as will be described later, as the slider 26 is moved, they move up or down the holder 27 and the regulation plate holder 28 at a given timing.

As shown in FIG. 1, the holder 27 has a storage section 27A capable of storing therein the magnetic disc pack 10, and also has in the central portion thereof an opening 52 through which the drive shaft 32 of the support plate 24 and the magnetic head can be inserted. Further, the holder 27 includes on the two sides thereof side surfaces 50, 50 which are foldedly formed, respectively, and each of the side surfaces 50, 50 is provided with one guide pin 54A and one guide pin 54B projecting therefrom. These guide pins 54A, 54B are guided by the restricting grooves 66, 67 in the side portions 24B, 24B of the support plate 24 and the cams 76, 78 of the slider 26 to move the holder 27 parallel to the support plate 24 and move it upward or downward with the magnetic disc pack 10 stored within the holder 27 to thereby guide the holder 27 to a position in which the center core 14 of the magnetic disc pack 10 can be brought into engagement with the drive shaft 32. It should be noted here that the holder 27 is being energized toward the support plate 24 by a spring 55.

The regulation plate holder 28 is rotatably mounted via a shaft 28A thereof into holes 69 respectively formed in the side portions 24B of the support plate 24 and is also energized in the direction of the support plate 24 by a spring 28B.

The regulation plate holder 28 is, as in the holder 27, provided on the two side surfaces thereof with guide pins 56 which are respectively guided by the cams 78 of the slider 26 to raise or lower the regulation plate holder 28 with respect to the support plate 24. The regulation plate holder 28 is provided on the rear surface thereof and through a mount plate 63 for a regulation plate with a regulation plate 64 which has a function to locate the magnetic disc 12 along the side of the magnetic head when the still image information or the like is recorded into or reproduced from the magnetic disc 12 by use of the magnetic head.

Description will be given below of the operation of the magnetic disc pack loading / unloading device constructed in the above-mentioned manner. At first, if, as shown in FIG. 2, the magnetic disc pack 10 is inserted into the holder 27, then the magnetic disc pack 10 is provisionally secured within the holder 27 as described before, when the shutter 20 of the magnetic disc pack 10 is opened and the window portion 18 of the magnetic disc pack is also opened. At this time, although the guide pins 54A, 54B of the holder 27 are located at the upper ends of the tapered portions 76A, 76B of the cams 76, 78, as shown in FIG. 2, they are also located in the horizontal portions of the restricting grooves 66, 67, respectively, so that the holder 27 is able to move in the horizontal direction only. In this state, the holder 27 is situated at a position apart from the drive shaft 32. Also, the guide pins 56 of the regulation plate holder 28 are located on the flat portions of the cams 78 of the slider 26 and stand still, respectively. If the slider 26 is moved to the left in FIG. 2, that is, in the magnetic disc pack insertion direction from this state, then the guide pins 54A, 54B of the holder 27 first move horizontally in the left direction in FIG. 2 along the horizontal portions of the restricting grooves 66, 67 formed in the support plate 24. After then, when the guide pins 54A, 54B enter the vertical portions of the restricting grooves 66, 67, then the horizontal movements of the guide pins 54A, 54B are restriced, that is, the guide pins 54A, 54B are guided by the tapered portions 76A, 78B of the cams 76, 78 to move downward, with the result that the holder 27 is moved downward toward the drive shaft 32 and thus the center core 14 of the magnetic disc pack 10 can be mounted to the drive shaft 32 shown in FIG. 1.

On the other hand, while the above-mentioned guide pins 54A, 54B are moving, as shown in FIG. 2, the guide pins 56 of the regulation plate holder 28 initially move along the flat portions 78A of the cams 78 of the slider 26, while the regulation plate holder 28 is left unchanged in position. When the guide pins 56 of the regulation plate holder 28 reach the tapered portions 78B of the cams 78 and are located there, then, as shown in FIG. 3, the regulation holder 28 is guided by the tapered portions 78B to move downwardly and the regulation plate 64 is then located within the window portion 18 of the magnetic disc pack 10, that is, located at the position opposed to the magnetic head. While the guide pins 56 of the regulation plate holder 28 are moving along the tapered portions 78B of the slider 26, as shown in FIG. 3 and 4, the guide pins 54A, 54B of the holder 27 are situated apart from the tapered portions 76A, 78B of the slider 26 and are fitted into the vertical portions of the restrictineg grooves 66, 67 in the side portions 24B of the support plate 24. Therefore, in this position the position of the holder 27 is not changed. In this state the magnetic head is situated in the window portion 19 of the magnetic disc pack 10 and thus it is able to magnetically record the still image information into the magnetic disc 12 of the magnetic disc pack 10 or reproduce the still image information therefrom. In FIG. 4, there is shown such magnetic recording or reproducing state.

In order to take out the magnetic disc pack 10, the above-mentioned operation may be reversed. That is, if the slider 26 is moved from the position shown in FIG. 4 in the opposite direction, namely, in the right direction, then first the guide pins 56 of the regulation plate holder 28 are pushed up by the tapered portions 78B of the cams 78 to move upwardly so that the regulation plate 64 escapes out of the window portion 18 of the magnetic disc pack 10 and retreats upwardly. While the regulation plate holder 28 is retreating upwardly, the guide pins 54A, 54B of the holder 27 have not yet arrived at the tapered portions 76A, 78B of the slider 26 and are fitted into the vertical portions of the restricting grooves 66, 67, that is, they are prevented from moving therefrom. Therefore, there is no possibility that the holder 27 may be moved to impinge against the regulation plate holder 28. When the upward movement of the regulation holder 28 is completed, then the guide pins 54A, 54B of the holder 27 reach the tapered portions 76A, 78B of the slider 26 and, under restriction of the tapered portions 76A, 78B, are then moved in directions opposite to the above-mentioned directions, that is, in the upward and right directions. Following this movement, the holder 27 also moves upwardly as well as horizontally in the right direction to return to the position shown in FIG. 2 in which the magnetic disc pack 10 can be inserted or taken out.

Figure 7:
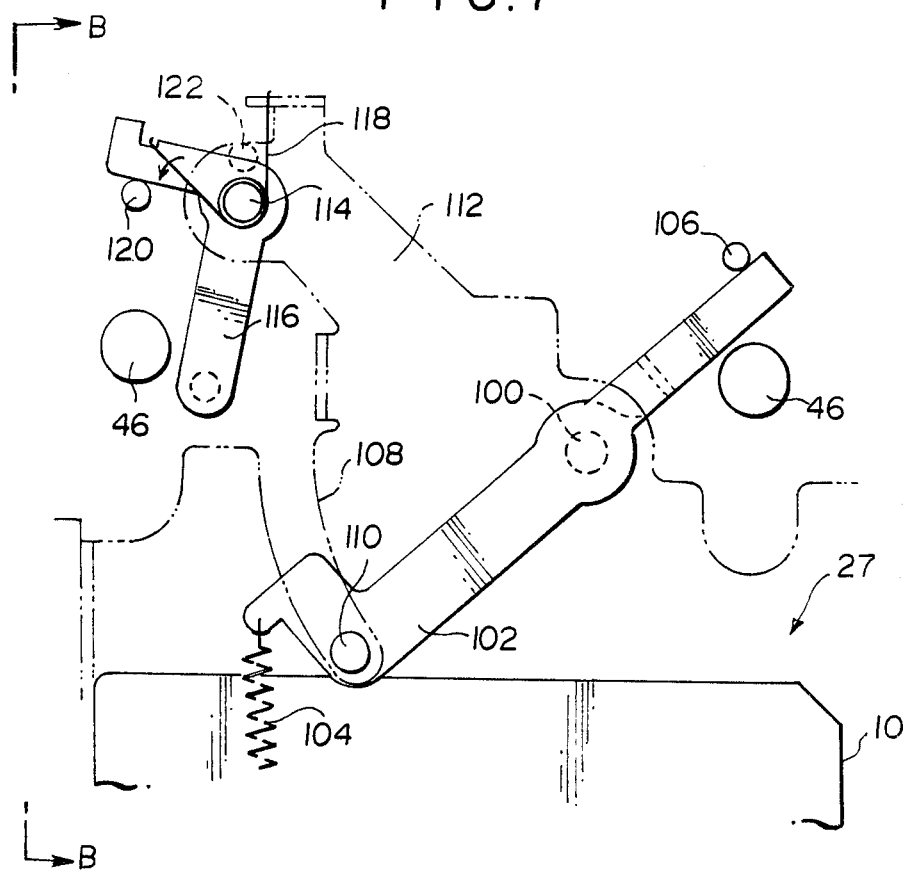
FIG. 7 is an explanatory view to illustrate an eject mechanism employed in a magnetic disc pack loading-/unloading device according to the invention.
Figure 8:
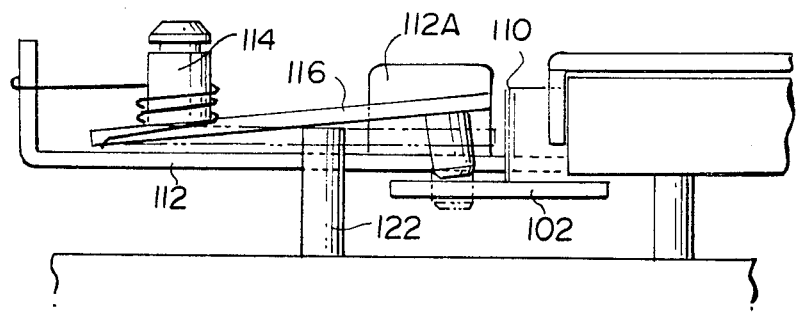
FIG. 8 is a section view taken along the line B—B in FIG. 7.

Next, description will be given of an eject mechanism employed in a magnetic disc pack loading/unloading device constructed according to the present invention in connection with FIGS. 7 through 9. At first, on the bottom surface of the holder 27 there is supported via a shaft 100 an eject lower 102 in such a manner that it is free to rotate, which eject lever 102 is energized by a spring 104 in a counter-clockwise direction in FIG. 7 and is also in contact with the stopper pin 106 erected on the support plate 24, that is, is situated in a position shown in FIG. 7. The holder 27 is formed on the bottom surface thereof with an arc-like groove 108, in which arc-like groove 108 there is located a pin 110 erected on the eject lever 102. Therefore, if the eject lever 102 is rotated in a clockwise direction against the energizing force of the spring 104, then the pin 110 is moved within the arc-like groove 108. On the other hand, on the deep side (upper side in FIG. 7) of the holder 27 there is projectingly formed a mount piece 112 to which is rotatably mounted a lock lever 116 of the eject lever 102 via a shaft 114. The lock lever 116 is energized by a spring 118 in the counter-clockwise direction in FIG. 7, is abutted against a stop pin 120 erected from the support plate 24, and is stopped at a position shown in FIG. 7. As shown in FIG. 8, the lock lever 116 is adapted to be movable in the axial direction of the shaft 114 and is pressed and energized by the spring 118 toward the mount piece 112. Also on the support plate 24, there is erected a release pin 122 which is adapted to push up the lock lever 116 when the lock lever 116 is released from the engaged position thereof.

Next, description will be given of the operation of the eject mechanism in connection with FIGS. 9(A) through (D). As shown in FIG. 9(A), if the magnetic disc pack 10 is inserted into the holder 27, then the front end portion of the magnetic disc pack 10 is brought into abutment with the pin 110 of the eject lever 102. At that time, the eject lever 102 is situated at a position shown by imaginary lines in FIG. 9(A). If the magnetic disc pack 10 is pushed in against the energizing force of the spring 104 in this state, then the eject lever 102 is positioned substantially horizontally as shown by solid lines in FIG. 9(A), and in this state the magnetic disc pack 10 is secured within the holder 27. This securement of the magnetic disc pack 10 is performed by bringing an engagement claw (not shown) into engagement with the recess 22 (shown in FIG. 5) of the magnetic disc pack 10.

If the magnetic disc pack 10 is inserted into the holder 27 completely, then a loading switch (not shown) is put into operation to move the holder 27 in an upward direction in FIG. 9(A). Since the lock lever 116 is supported by the holder 27, when the holder 27 moves upwardly, then the lock lever 116 is gradually rotated in the counter-clockwise direction by the energizing force of the spring 118 to come into engagement with a projection 102A of the eject lever 102 to thereby lock the eject lever 102 as shown in FIG. 9(B).

The eject lever 102 can be locked by the lock lever 116 only after the magnetic disc pack 10 has been inserted into the holder 27 and the holder 27 has moved horizontally a given amount of distance (that is, it has moved upwardly in FIG. 9). Therefore, even if the magnetic disc pack 10 has been inserted into the holder 27, the eject lever 102 cannot be locked yet since the holder 27 has not moved the given amount of distance in the horizontal direction. As a result of this, even if the power supply is cut off due to an accident or the like after the magnetic disc pack 10 is inserted, the magnetic disc pack 10 can be discharged by the eject lever 102 and thus there is eliminated a possibility of the magnetic disc pack 10 being left within the holder 27. This can also serve as a complete dust preventive measure.

While the eject lever 102 is being locked, if the holder 27 is moved horizontally and is then lowered, that is, it is moved toward the drive shaft by means of the above-described operation, then the magnetic disc pack 10 is also moved down and is then secured by the positioning pins 46, 46, 46. At this time, when the holder 27 is moved down, then the lock lever 116 is pushed up by a release pin 122 to release the engagement between the lock lever 116 and the eject lever 102, so that, as shown in FIG. 9(C), the lock lever 116 is disengaged from the eject lever 102, is then rotated in the counter-clockwise direction by the rotatative energizing force of the spring 118 to be abutted against the stop piece 112A, and is then stopped. In this state, although the eject lever 102 is not locked, since the holder 27 is restricted by the restricting grooves 66, 67 and the eject lever 102 is restricted by the pin 106, there is no possibility that the magnetic disc pack 10 may be thrown out by the spring 104. This is a magnetic recording/reproducing state.

Then, after completion of the magnetic recording or reproduction, when the eject operation of the magnetic disc pack 10 is started, then the holder 27, with the eject lever 102 in abutment with the pin 106, is moved upwardly, and next the holder 27 begins to move gradually in the downward direction in FIG. 9(C). When the holder 27 begins to move downward, then the eject lever 102 starts to move in the counter-clockwise direction with the movement of the magnetic disc pack 10, since the eject lever 102 is energized by the spring 104 and is thus in abutment with the magnetic disc pack 10, as shown in FIG. 9(D). However, the eject lever 102 is gradually rotated in the counter-clockwise direction according to the retreat motion of the holder 27 in such a state that the eject lever 102 is in abutment with the stop pin 106, so that there is no possibility that the magnetic disc pack 10 may be thrown out from the holder 27 by the eject lever 102.

Now, we will describe below a misinsertion prevention mechanism employed in the magenetic disc pack loading/unloading device according to the invention.

As shown in FIG. 1, there is provided a front panel 150 in the front-side open end of the support plate 24. The front panel 150 is formed with an insertion opening 152 throgh which the magnetic disc pack 10 can be inserted as well as a display window 154 located adjacent to the insertion opening 152 to indicate whether the magnetic disc pack 10 is stored or not.

Figure 10:
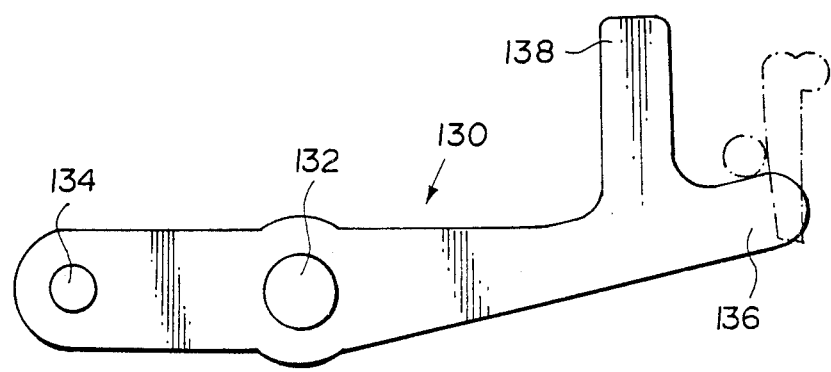
FIG. 10 is a front view of a lock lever employed in a misinsertion preventing mechanism of the magnetic disc pack loading/unloading device according to the invention.

To the support plate 24, there is mounted a lock lever 130 such that it can be rotated around a shaft 132. In FIG. 10, there is shown a general configuration of the lock lever 130 at one end of which there is provided a guide pin 134 projecting therefrom. The guide pin 134, as shown in FIG. 1, is situated inwardly of an opening 135 formed in the support plate 24 and is also fitted into a cam groove 140 formed in the slider 26. The cam groove 14 is curvedly formed such that it becomes lower in level toward the central portion thereof. Therefore, when the slider 26 is moved, then the lock lever 130 is guided by the cam groove 140 and is caused to swing about the shaft 132. The lock lever 130 is provided on the other end thereof with a lock portion 138 as standing up therefrom. As will be discussed afterwards, the lock portion 138 is adapted to close the lid of the insertion opening 152 so as to prevent the misinsertion of the magnetic disc pack 10 during the magnetic recording/reproducing operation.

The insertion opening 152 is provided with a lid 142 which can opened or closed about a shaft 144 and is also energized by a spring in the closing direction thereof.

The following is the action of the misinsertion prevention mechanism of the magnetic disc pack loading-/unloading device constructed in the above-mentioned manner.

Figure 11:
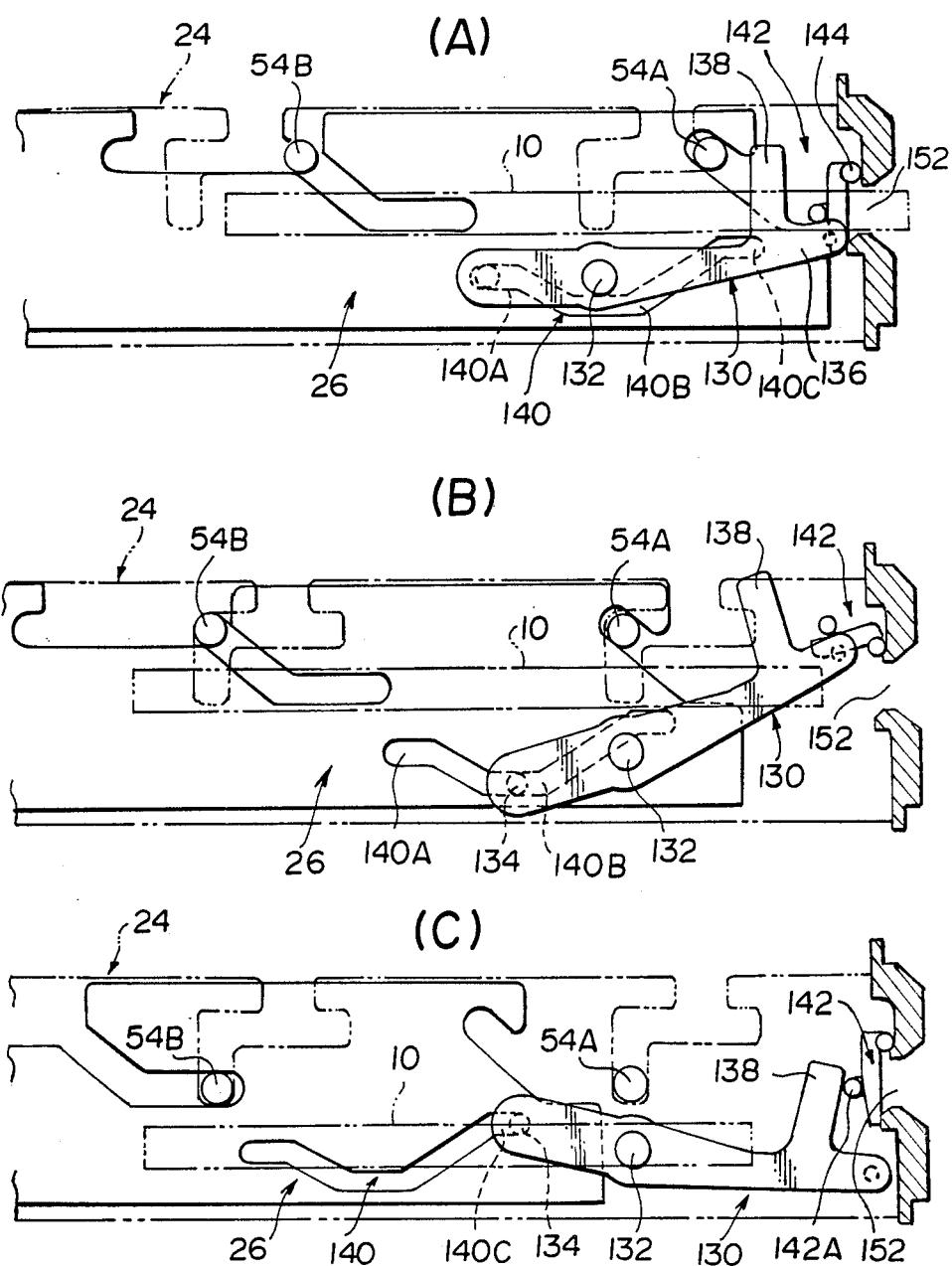
FIGS. 11 (A) through (C) are respectively explanatory views to illustrate the operation of the above-mentioned misinsertion preventing mechanism.

First, prior to the insertion of the magnetic disc pack 10, as shown in FIG. 11(A), the guide pin 134 of the lock lever 130 is located in the left horizontal portion 140 of the slider cam groove 14. If the magnetic disc pack 10 is inserted from the insertion opening 152, then the lid 142 of the insertion opening 152 is pushed by the magnetic disc pack 10 and is opened against the energizing force of the spring. When the magnetic disc pack 10 is inserted completely into the holder 27, then the slider 26 is moved in the left direction in FIG. 11 (A) and the magnetic disc pack 10 is also moved horizontally together with the holder 27. At this time, the guide pin 134 of the lock lever 130 is moved from the left horizontal portion 140A of the cam groove 140 to the lower horizontal portion 140B thereof, which causes the lock lever 130 to rotate about the shaft 132 in the counter-clockwise, with the result that the lock lever 130 is put into a condition shown in FIG. 11(B). At this time, the lid 142 of the insertion opening 152 remains in contact with the upper surface of the magnetic disc pack 10, that is, it is located in the open position thereof. If the slider 26 is moved further to the left from this condition, then the magnetic disc pack 10 is moved down along with the holder and is set to the magnetic recording/reproducing position, as mentioned above. Following this setting, the lid 142 is also removed from the contact with the magnetic disc pack 10 and, as shown in FIG. 11(C), is then closed by the energizing force of the spring. At this time, the guide pin 134 of the lock lever 130 is moved from the lower horizontal portion 140B of the cam groove 140 to the right horizontal portion 140C thereof. This causes the lock lever 130 to rotate about the shaft 132 in the clockwise direction into a position shown in FIG. 11(C), with the lock portion 138 thereof being in contact with the pin 142 A of the lid 142. Since the guide pin 134 of the lock lever 130 is situated in the right horizontal portion 140C of the cam groove 140, the movement of the lock lever 130 is restricted. For this reason, the lid 142 of the insertion opening 152 is locked by the lock portion 138 of the lock lever 130 and thus cannot be opened. As a result of this, it is possible to prevent the misinsertion of the magnetic disc pack 10 during the magnetic recording/reproducing operation.

Also, as shown in FIGS. 12(A), (B), (C), the display window 154 is provided with a colored display plate 156 which is free to slide in a vertical direction. The display plate 156 is provided at the lower end thereof with a substantially L-shaped lever 158, and is also energized in an upward direction by the energizing force of a spring 159. Therefore, since the display plate 156 is normally situated in a position shown in FIG. 12(A) off from the display window 154 unless any external force is given thereto, the display plate 156 cannot be displayed in the display window 154. Therefore, since as shown in FIGS. 12(A), (B) a pin 139 provided in the lock lever 130 for pushing down the display plate 156 is not situated at a position to be able to push down the lever 158 while the lock lever 130 is located in a position shown in FIGS. 11(A), (B), no display to indicate that a magnetic recording or reproducing operation is being performed is found in the display window 154.

On the other hand, when the lock lever 130 is situated at a position shown in FIG. 11(C), then, as shown in FIG. 12(C), the pin 139 pushes down the display plate 156 against the energizing force of the spring 159 and thus the display plate 156 is located at a position facing the display window 154 so as to display that the magnetic recording or reproducing operation is being performed. As a result of this, the misinsertion of the magnetic disc pack can be prevented more completely.

Further, in the above-mentioned embodiment, when the power supply is cut off due to an accident or the like during the magnetic recording or reproducing operation, since the indication telling that the magnetic recording or reproducing operation is under way is displayed in the display window 154, it is possible to know from the outside that the magnetic head is in abutment with the magnetic disc. Therefore, although, generally, if the magnetic head is left for a long time in abutment with the magnetic disc, then there will be produced a pressure sign or the like in the magnetic disc which may give rise to the dropout of the magnetic disc, according to the above-described embodiment of the invention, the action of the display plate 156 of the display window 154 can tell without delay that the magnetic disc is being set, which can provide an effective pressure sign preventive measure.

Figure 13:
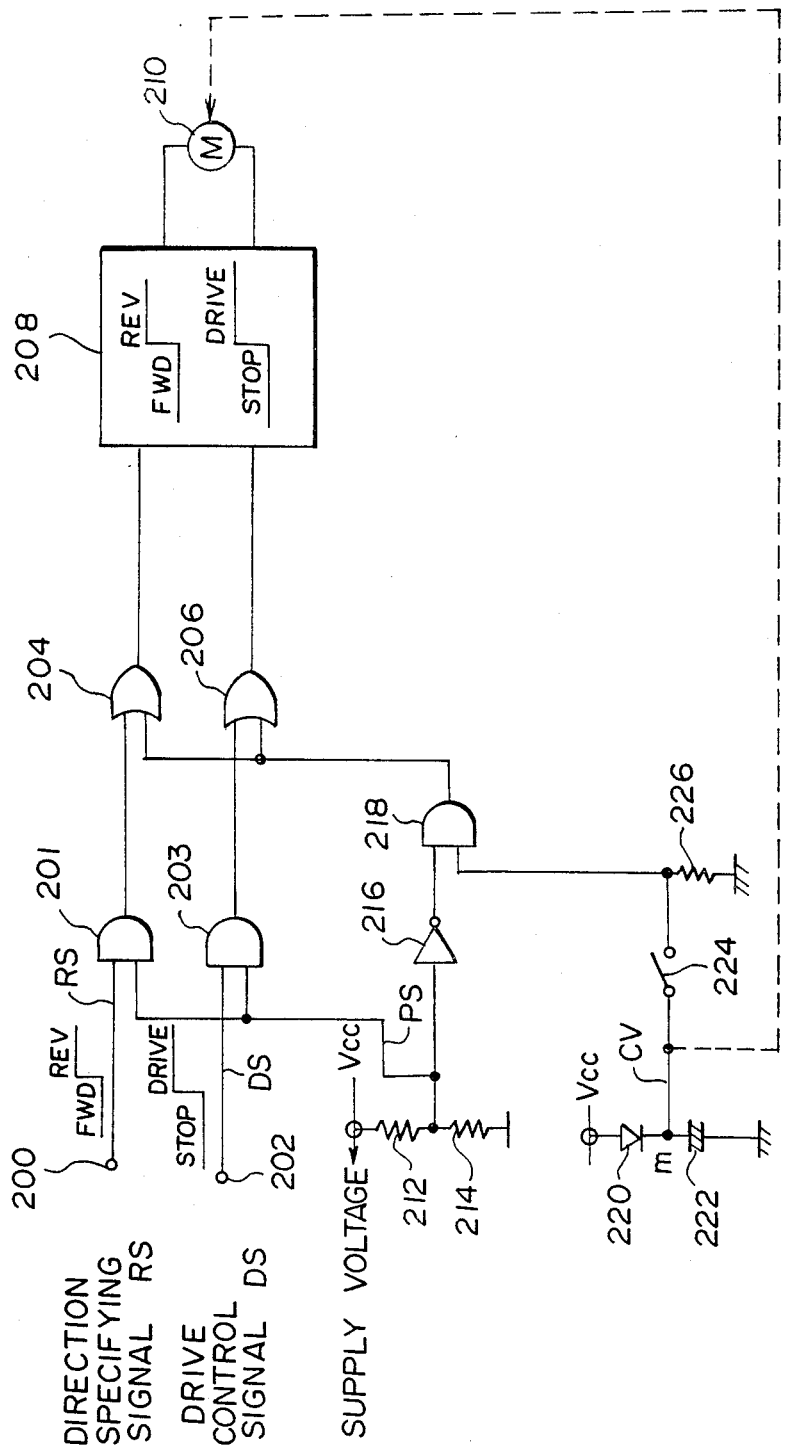

Next, in FIG. 13, there is shown the structure of a drive control circuit employed in a slider drive motor 210 for driving the slider 26. In this figure, there are provided input terminals 200, 202 to which are respectively input control signals issued from a controller (not shown) for driving and controlling the slider drive motor 210. To the input terminal 200 is input a direction specifying signal RS for specifying the direction of movement of the slider 26, that is, the rotational direction of the motor 210. The direction specifying signal RS goes into a low level (which will be hereinafter referred to as L level) when the slider 26 is to be moved in a forward direction (the motor 210 is rotated in a forward direction), that is, in the insertion direction of the magnetic disc pack 10, while it goes into a high level (which will be hereinafter referred to as H level) when the slider 26 is to be moved in a reverse direction (the motor 210 is rotated in a reverse direction), that is, in the discharge direction of the magnetic disc pack 10.

On the other hand, to the input terminal 202 is input a drive control signal DS for indicating the drive/stop of the slider drive motor 210. The drive control signal DS goes to the L level when stopping the slider drive motor 210, while it goes to the H level when driving the motor 210.

A main source is normally supplying power to the slider drive motor 210 and the state of the power supply is controlled by the control signals RS, DS.

The direction specifying signal RS input through the input terminal 200 is normally ANDed by AND gate 201 with a decision signal PS to decide whether the power being supplied to the parts of the circuit is on or off. The decision signal PS can be obtained by dividing a supply voltage Vcc by means of resistors 212, 214.

Also, the decision signal PS is ANDed with the drive control signal DS by AND gate 203 and the decision signal PS is further input via an inverter 216 to one of the input terminals of AND gate 218.

On the other hand, between a power line and an earth wire there is connected a series of a diode 220 and a capacitor 222 and the connection point m between the diode 220 and the capacitor 222 is connected via a slider switch 224 to the other input terminal of AND Gate 218, which input terminal is grounded via a resitor 226.

The above-mentioned slider switch 224 is provided on the support plate 24 and can be operated to turn on or off according to the positions of the slider 26. That is, the slider switch 224 turns on when the slider 26 is caused to move in the insertion direction of the magnetic disc pack 10 and thus the regulation plate provided on the rear surface of the regulation plate holder 28 is pushed downward, namely, when the slider 26 is set in a magnetic recording or reproducing condition, while the slider switch 224 turns off when the slider 26 is moved in the discharge direction of the magnetic disc pack 10 and thus the regulation plate 64 is retreated from the magnetic disc.

The respective output signals of AND Gates 201, 218 are ORed with each other by OR Gate 204 and the respective output signals of AND Gates 203, 218 are ORed with each other. The ORed outputs of these OR gates 204, 206 are respectively input to a motor drive circuit 208.

The motor drive circuit 208 outputs to the slider drive motor 210 a drive signal to drive or stop the slider drive motor 210 in accordance with the output signal of OR Gate 204. When the power source for supplying power to the various parts of the circuitry is cut off, the charging voltage of the capacitor 222 is normally supplied to the slider drive motor 210.

In the above-mentioned structure, when the power source for normally supply power to the respective circuit parts is turned on, the decision signal PS is in the H level. In this condition, if the magnetic disc pack 10 is inserted into the holder 27 as well as if the direction specifying signal to move the slider 26 in the forward direction is input to the input terminal 200 from controller (not shown)and the drive control signal DS to drive the motor 210 is input to the input terminal 202 from the same controller, then the output signal of AND Gate 201 goes into the L level and the output signal of AND Gate 203 goes into the H level, which output signals are output respectively through OR Gate 204 and OR Gate 206 to the motor drive circuit 208. As a result of this, the slider drive motor 210 is driven in the forward rotation direction and the regulation plate holder 28 is moved downward, which completes the loading of the magnetic disc pack 10.

In order to take out or unload the loaded magnetic disc pack 10, if the direction specifying signal RS to move the slider 26 in the reverse direction is input to the input terminal 200 and the drive control signal DS to drive the slider drive motor 210 is input to the input terminal 202 respectively from the controller, then the output signals of AND Gates 201, 203 go to the H levels together and are output respectively through OR Gates 204, 206 to the motor drive circuit 208. As a result of this, the slider drive motor 210 is driven to rotate in the reverse direction and the slider 26 is moved in the discharge direction of the magnetic disc pack 10.

Next, description will be given of a case when the power supply from the main source normally supplying power to the respective parts of the circuit is cut off. In this case, since the decision signal PS to decide the on/off state of the source goes into the L level, there is no possibility that the slider drive motor 210 may be driven into rotation by control signals which are input to the input terminals 200, 202 from the controller.

On the other hand, the decision signal PS is inverted into the H level by an inverter 216 and is then input to one input terminal of AND Gate 218. After the loading of the magnetic disc pack 10 is completed, that is, when the regulation plate 64 is located at the magnetic recording or reproducing position and the magnetic disc 12 is set in the recording/reproducing condition, the power supply is on. In this state, if the power supply is cut off, then the charging voltage CV of the capacitor 222 is input to the other input terminal of AND Gate 218 and then output signals of the H level are output from AND Gate 218 respectively through OR Gates 204, 206 to the motor drive circuit 208, so that the slider driver motor 210 is rotationally driven to move the slider 26 in the reverse direction and at the same time the regulation plate 64 is moved upwardly apart from the magnetic disc. When the slider 26 moves retreatingly, then a slider switch 224 becomes off and thus the output signal of AND Gate 218 goes to the L level, so that the rotational driving of the slider drive motor 210 is caused to stop.

As described above, in the illustrated embodiment of the invention, when the main power source supplying power to the respective parts of the circuit used is cut off, the capcitor that can be charged while the main source is operating normally is employed as an emergency auxiliary power source. However, the invention is not limited to this, but a battery for backup may also be used.

As has been described heretofore, in the magnetic disc pack loading/unloading device according to the present invention, the eject lever is adapted to push out the magnetic disc pack gradually according to the retreat movement of the holder, thereby eliminating the possibility that the magnetic disc pack may fly forcefully from the holder.

Also, there is provided such a discharge function that even if the magnetic disc pack is already inserted into the holder the eject lever cannot be locked until the holder is pulled in a given amount of distance within the main body of the magnetic recording/reproducing apparatus. Therefore, if the power supply is cut off due to an accident or the like, it is easy to take out the magnetic disc pack, thereby eliminating the possibility of the magnetic disc pack being left alone in the holder in the open state of the shutter.

Further, since the lid of the magnetic disc pack insertion opening is locked during the magnetic recording/reproducing operation, it is possible to prevent the misinsertion of the magnetic disc pack.

In addition, even if the power supply is cut off during the magnetic recording/reproducing operation, since the regualtion plate is adapted to move apart from the magnetic head, there is no possibility that there may be produced any pressure sign or the like in the magnetic disc even if the magnetic disc is left alone for a long period of time in the power-off state.

It should be understand, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A device for loading or unloading a magnetic disc pack used in a magnetic recording and/or reproducing apparatus in which said magnetic disc pack is located at a position where a magnetic recording or reproducing operation is performed, a magnetic disc rotatably stored within said magnetic disc pack is rotated, and a magnetic head is moved in the radial direction of said magnetic disc to thereby carry out said magnetic recording or reproducing operation, said magnetic disc pack loading or unloading device comprising:
   a holder (27) for storing said magnetic disc pack therein and having a plurality of guide pins (54) projecting therefrom;
   a support plate (24) including therein L-shaped restricting groove means (66, 67), formed in a direction where said magnetic disc pack is inserted into said holder and in a direction intersecting with said magnetic disc pack insertion direction, for receiving said guide pins and for restricting the movement of said holder between a position where said magnetic disc pack is inserted into said holder and a position where said magnetic disc pack within said holder is located at said magnetic recording or reproducing position;
   a slider (26) supported by said support plate such that it is free to advance or retreat in said magnetic disc pack insertion direction so as to be able to move said holder along said restricting grooves formed in said support plate;
   drive means (92, 94) for advancing said slider when loading said magnetic disc pack and for retreating said slider when unloading said magnetic disc pack;
   an eject lever (102) pivotally supported by said holder for urging said magnetic disc pack in a direction where said magnetic disc pack is discharged;
   lock means (116) for locking said eject lever in a state where said magnetic disc pack is completely stored;
   lock release means (122) for releasing the locking of said eject lever by said lock means when said magnetic disc pack is located at said magnetic recording or reproducing position; and
   brake means (106) for restricting the returning of said eject lever in connection with the operation of said holder when unloading.

2. A device for loading or unloading a magnetic disc pack as set forth in said claim 1, wherein said apparatus includes a main body and wherein said lock means comprises a mount piece member (112) provided in said holder so as to project therefrom, a shaft (114) erected on said mount piece member in a direction intersecting with said magnetic disc pack insertion direction, a lock lever (116) mounted to said shaft such that it is free to rotate and is slidable in the axial direction of said shaft, bias means (118) for biasing said lock lever for rotation toward locking said eject lever, and a stop pin (120) erected on said main body of said magnetic recording and/or reproducing apparatus for restricting the rotation of said lock lever, and also wherein said lock lever (116), in connection with the movement of said holder in said magnetic disc pack insertion direction during said loading operation, is rotated in a direction to lock said eject lever and is then brought into engagement with said eject lever.

3. A device for loading or unloading a magnetic disc pack as set forth in claim 2, wherein said lock release means comprises a lock release pin (122) erected on said apparatus main body, and said lock release pin, in connection with the movement of said holder in said direction intersecting with said magnetic disc pack insertion direction during said loading operation, pushes up said lock lever (116) to thereby release said locking of said eject lever (102).

4. A device for loading or unloading a magnetic disc pack as set forth in claim 1, wherein said brake means comprises a stop pin (106) erected on said apparatus for abutting said eject lever (102) and restricting the return thereof when said holder is moved for unloading and said eject lever has become unlocked.

5. A device for loading or unloading a magnetic disc pack used in a magnetic recording and/or reproducing apparatus in which said magnetic disc pack is located at a position where a magnetic recording or reproducing operation is performed, a magnetic disc rotatably stored within said magnetic disc pack is rotated, and a magnetic head is moved in the radial direction of said magnetic disc to thereby carry out said magnetic recording or reproducing operation, said magnetic disc pack loading or unloading device comprising:
- a holder (27) for storing said magnetic disc pack therein and having a plurality of guide pins (54) projecting therefrom;
- a support plate (24) including therein L-shaped restricting groove means (66, 67), formed in a direction where said magnetic disc pack is inserted into said holder and in a direction intersecting with said magnetic disc pack insertion direction, for receiving said guide pins and for restricting the movement of said holder between a position where said magnetic disc pack is inserted into said holder and a position where said magnetic disc pack within said holder is located at said magnetic recording or reproducing position;
- a slider (26) supported by said support plate such that it is free to advance or retreat in said magnetic disc pack insertion direction so as to be able to move said holder along said restricting grooves formed in said support plate;
- drive means (92, 94) for advancing said slider when loading said magnetic disc pack and retreat said slider when unloading said magnetic disc pack;
- an eject lever (102), pivotally supported by said holder, for urging said magnetic disc pack in a direction where said magnetic disc pack is discharged; and
- lock means (116) for locking said eject lever after said magnetic disc pack is inserted into said holder and, in said loading operation, said holder is moved a given amount of distance in said magnetic disc pack insertion direction.

6. A device for loading or unloading a magnetic disc pack as set forth in said Claim 5, wherein said apparatus includes a main body and wherein said lock means comprises a mount piece member (112) provided in said holder so as to project therefrom, a shaft (114) erected on said mount piece member in a direction intersecting with said magnetic disc pack insertion direction, a lock lever (116) rotatably mounted to said shaft, a spring (109) for energizing said eject lever (102) in a direction where said eject lever is locked, bias means (118) for biasing said lock lever (116) toward locking said eject lever (102) and a stop pin (120) erected on said main body of said magnetic recording and/or reproducing apparatus for restricting the rotation of said lock lever (116), and also wherein said lock lever, in connection with the movement of said holder in said magnetic disc pack insertion direction in said loading operation, is rotated in a direction to lock said eject lever and is then brought into engagement with said eject lever.

* * * * *